(12) United States Patent
Inokuchi et al.

(10) Patent No.: US 10,434,685 B2
(45) Date of Patent: Oct. 8, 2019

(54) RELEASE AGENT FOR TIRE BLADDER, TIRE BLADDER, AND PNEUMATIC TIRE

(71) Applicant: SHIN-ETSU CHEMICAL CO., LTD., Tokyo (JP)

(72) Inventors: Yoshinori Inokuchi, Annaka (JP); Takakazu Minato, Tokyo (JP); Nobuaki Honsho, Tokyo (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 84 days.

(21) Appl. No.: 15/552,113

(22) PCT Filed: Jan. 27, 2016

(86) PCT No.: PCT/JP2016/052272
§ 371 (c)(1),
(2) Date: Aug. 18, 2017

(87) PCT Pub. No.: WO2016/132834
PCT Pub. Date: Aug. 25, 2016

(65) Prior Publication Data
US 2018/0036917 A1    Feb. 8, 2018

(30) Foreign Application Priority Data
Feb. 20, 2015 (JP) .................... 2015-031659

(51) Int. Cl.
| | |
|---|---|
| B29D 30/06 | (2006.01) |
| B29C 33/64 | (2006.01) |
| C10M 173/02 | (2006.01) |
| C10M 107/50 | (2006.01) |
| C08L 71/02 | (2006.01) |
| C08L 83/06 | (2006.01) |
| C08G 77/14 | (2006.01) |
| C09D 183/06 | (2006.01) |
| C08G 77/38 | (2006.01) |

(52) U.S. Cl.
CPC .......... *B29C 33/64* (2013.01); *B29D 30/0654* (2013.01); *C08G 77/14* (2013.01); *C08G 77/38* (2013.01); *C08L 71/02* (2013.01); *C08L 83/06* (2013.01); *C09D 183/06* (2013.01); *C10M 107/50* (2013.01); *C10M 173/02* (2013.01); *C08L 2201/54* (2013.01)

(58) Field of Classification Search
CPC ..................................................... B29C 33/64
See application file for complete search history.

(56) References Cited

U.S. PATENT DOCUMENTS

| | | | |
|---|---|---|---|
| 4,431,452 A | 2/1984 | Comper et al. | |
| 4,509,984 A | 4/1985 | Scheiderich et al. | |
| 4,624,998 A * | 11/1986 | Keil ........................ | C08L 63/00 |
| | | | 523/435 |
| 4,678,815 A | 7/1987 | Hoffman | |
| 4,814,214 A | 3/1989 | Tomita et al. | |
| 4,863,650 A | 9/1989 | Kohler et al. | |
| 4,889,677 A | 12/1989 | Hashimoto et al. | |
| 6,576,734 B1 | 6/2003 | Matsuo et al. | |
| 8,101,279 B2 | 1/2012 | Guichard et al. | |
| 2004/0209785 A1* | 10/2004 | Guichard ............... | B29C 33/64 |
| | | | 508/208 |
| 2009/0114327 A1 | 5/2009 | Breunig | |
| 2010/0078104 A1 | 4/2010 | Breunig et al. | |
| 2010/0317555 A1* | 12/2010 | Araki ..................... | A61K 8/361 |
| | | | 510/122 |
| 2011/0086981 A1 | 4/2011 | Ashiura et al. | |

(Continued)

FOREIGN PATENT DOCUMENTS

| | | |
|---|---|---|
| EP | 0 103 871 A2 | 3/1984 |
| EP | 0 160 537 A2 | 11/1985 |
| JP | 57-111393 A | 7/1982 |
| JP | 57-119992 A | 7/1982 |

(Continued)

OTHER PUBLICATIONS

Translation of JP 10-212411 into English (no date).*
International Search Report for PCT/JP2016/052272 (PCT/ISA/210) dated May 10, 2016.
Written Opinion of the International Searching Authority for PCT/JP2016/052272 (PCT/ISA/237) dated May 10, 2016.
Extended European Search Report dated Jun. 19, 2018, in European Patent Application No. 16752223.4.

*Primary Examiner* — Marc S Zimmer
(74) *Attorney, Agent, or Firm* — Birch, Stewart, Kolasch & Birch, LLP

(57) ABSTRACT

A release agent for being coated onto a tire bladder made of a zinc-oxide-incorporated butyl rubber during pneumatic-tire molding, the release agent containing (A) organopolysiloxane, which contains a carboxy group indicated by the general formula (1) below

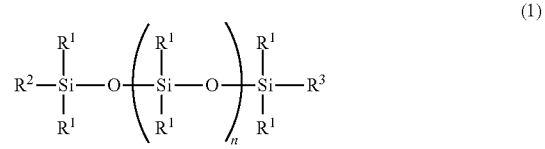

(1)

(in the formula, $R^1$ is a substituted or unsubstituted C1-C30 monovalent hydrocarbon group excluding $R^2$, $R^2$ is a carboxy-group-substituted C1-C30 monovalent organic group, $R^3$ is $R^1$ or $R^2$, and n is an integer of 3 to 2000.). This release agent produces a longer service life of a tire bladder and leads to reduced tire production cost because the amount of silicone that migrates to the tire side is low when the tire is released, and repeated mold-release performance is enhanced.

12 Claims, No Drawings

(56) References Cited

U.S. PATENT DOCUMENTS

| | | | | |
|---|---|---|---|---|
| 2013/0053512 A1* | 2/2013 | Kojima | ............... | C08G 77/04 524/588 |
| 2016/0166495 A1* | 6/2016 | Sarkar | ............... | A61K 8/891 424/61 |

FOREIGN PATENT DOCUMENTS

| | | | | |
|---|---|---|---|---|
| JP | 59-106948 | A | | 6/1984 |
| JP | 60-179211 | A | | 9/1985 |
| JP | 60-229719 | A | | 11/1985 |
| JP | 61-100417 | A | | 5/1986 |
| JP | 61-215015 | A | | 9/1986 |
| JP | 62-3908 | A | | 1/1987 |
| JP | 62-275711 | A | | 11/1987 |
| JP | 63-147610 | A | | 6/1988 |
| JP | 8-323773 | A | | 1/1989 |
| JP | 64-004654 | A | | 1/1989 |
| JP | 5-139997 | A | | 6/1993 |
| JP | 6-134769 | A | | 5/1994 |
| JP | 6-339927 | A | | 12/1994 |
| JP | 10-212411 | A | * | 8/1998 |
| JP | 11-114970 | A | | 4/1999 |
| JP | 11-198150 | A | | 7/1999 |
| JP | 2000-158454 | A | | 6/2000 |
| JP | 2001-172390 | A | | 6/2001 |
| JP | 2005-527671 | A | | 9/2005 |
| JP | 2008-536967 | A | | 9/2008 |
| JP | 2010-505970 | A | | 2/2010 |
| JP | 2010-241915 | A | | 10/2010 |
| JP | 2010-285526 | A | | 12/2010 |
| JP | 2011-161766 | A | | 8/2011 |

* cited by examiner

RELEASE AGENT FOR TIRE BLADDER, TIRE BLADDER, AND PNEUMATIC TIRE

TECHNICAL FIELD

The present invention relates to a release agent which is applied to the surface of a tire bladder made of zinc oxide-containing butyl rubber that is used for molding pneumatic tires, the tire bladder coated with this release agent, and a pneumatic tire molded using this tire bladder.

BACKGROUND ART

Tire molding is typically carried out by setting an uncured (green) tire in a mold and then inserting a butyl rubber sac-like member called the tire bladder on the inside of the green tire, pressing the green tire against the mold from the inside by inflating the tire bladder with high-temperature, high-pressure steam, and heating in this state to cure the tire. To allow the tire bladder to be stripped from the tire after molding, a release agent is applied to the inner wall of the green tire and the surface of the tire bladder. Liquid silicone-containing compositions and curable silicone-containing compositions are used as the release agent that is applied to the surface of the tire bladder.

Examples of liquid silicone-containing compositions include compositions containing a polydimethylsiloxane having a viscosity of 40,000 to 120,000 mm$^2$/s and bentonite clay (JP-A S57-119992: Patent Document 1), compositions containing a polydimethylsiloxane having a viscosity of 15×10$^6$ to 25×10$^8$ mm$^2$/s, a polydimethylsiloxane having a viscosity of 40,000 to 120,000 mm$^2$/s and bentonite clay (JP-A S57-111393: Patent Document 2), compositions containing a polyorganosiloxane having an average degree of polymerization of 2,500 to 6,000 and a polyorganosiloxane having an average degree of polymerization of 800 to 1,600 (JP-A S63-147610: Patent Document 3), and compositions containing a silicone oil a viscosity of having at least 100 mPa·s and a silicone rubber powder (JP-A 2000-158454: Patent Document 3).

Applying a release agent after the tire bladder has been mounted on the tire molding machine is difficult, and so it is desired that the release agent, when simply applied prior to use of the bladder, be capable of repetitive release. Although it is also possible to remove the tire bladder from the molding machine and again apply the release agent to it, this is an operation that takes considerable time and effort. With the above liquid silicone-containing compositions, the liquid silicone migrates to the tire side when the tire separates from the bladder, resulting in a loss of silicone from the bladder surface and thus poor repetitive releasability.

Curable silicone-containing compositions have therefore been described. Examples include compositions containing a silicone which forms a rubber under the application of heat (JP-A S59-106948: Patent Document 5), organopolysiloxane latex compositions obtained by emulsion polymerizing a cyclic diorganopolysiloxane or a diorganopolysiloxane capped with silanol at both ends with a functional group-bonded organotrialkoxysilane or a functional group-bonded organodialkoxysilane (JP-A S60-179211: Patent Document 6), compositions containing a diorganopolysiloxane having hydroxyl groups at both ends, an aminoalkyl group-containing hydrolyzable silane and an amino-modified organopolysiloxane (JP-A H06-134769: Patent Document 7), compositions containing a diorganopolysiloxane having hydroxyl groups at both ends, an aminoalkyl group-containing hydrolyzable silane, and a silicone oil having organic groups selected from aryl groups, aralkyl groups and polyether residues (JP-A H08-323773: Patent Document 8), compositions containing a hydroxyl- or alkoxy-terminated diorganopolysiloxane, a siloxane having an aminoalkyl group and a siloxane having an epoxy group (JP-A H11-198150: Patent Document 9), compositions containing a linear organopolysiloxane having hydroxyl groups, a polyorganosiloxane resin, and a crosslinking agent having a functional group capable of reacting with the polyorganosiloxane resin (JP-A 2005-527671: Patent Document 10), compositions containing a linear organopolysiloxane having hydroxyl or alkoxyl functional groups at both ends and either a hydroxylated or alkoxylated organopolysiloxane resin or a crosslinking agent having a hydroxyl or alkoxyl functional group (JP-A 2008-536967: Patent Document 11), and compositions containing a non-reactive linear organopolysiloxane, a reactive linear organopolysiloxane having hydroxyl groups, a silicone-compatible crosslinking agent and a triol silane having an aminoalkyl group (JP-A 2010-505970: Patent Document 12).

A curable silicone, after being applied to the surface of a tire bladder, forms a film having elasticity. This film must have an extensibility that enables it to follow stretching of the tire bladder when the bladder is inflated and must also be strong enough to not break or abrade upon rubbing against the tire when the bladder is stripped from the tire. Moreover, the film must strongly adhere to the bladder rubber when the bladder is in an inflated state, even at the curing temperature. Because fully satisfying these properties has been difficult, the repetitive release performance has been inadequate. Achieving strong adherence to the bladder rubber has been especially difficult. Efforts hitherto made to improve adherence to the bladder rubber include one method in which the bladder is first coated with a primer treatment agent and is subsequently coated with a rubber-forming silicone (JP-A S61-215015: Patent Document 13). In another such method, a room temperature-curable silicone rubber layer having adhesion to the bladder rubber is formed as an inner layer and a condensation-type silicone resin layer is formed as an outer layer (JP-A H06-339927: Patent Document 14). However, adherence remains inadequate.

Organohydrogenpolysiloxane-containing compositions have thus been disclosed. Examples include compositions containing an organohydrogenpolysiloxane, a hydroxyl group-containing organopolysiloxane rubber and a lubricant (JP-A S62-3908: Patent Document 15), compositions containing a compound having an Si—H group, an organopolysiloxane having a viscosity of from 3,000 to 5,000,000 mm$^2$/s, and silica (JP-A S62-275711: Patent Document 16), and compositions containing an organohydrogenpolysiloxane and a diorganopolysiloxane end-capped with a trialkylsilyl group and having a viscosity of 6×10$^6$ to 1×10$^{10}$ mPa·s (JP-A H11-114970: Patent Document 17). These have better repetitive release performances than the earlier-described compositions, presumably on account of the good adherence of the organohydrogenpolysiloxane to the bladder rubber. Organohydrogenpolysiloxanes are polymerizable, but the compositions do not necessarily cure to completion and organopolysiloxanes having a high degree of polymerization are thought to impart flexibility. However, because compositions containing these organohydrogenpolysiloxanes generate hydrogen gas when heated after being applied, there is a danger of the hydrogen gas igniting and causing an explosion or fire. Also, when such a composition is prepared as an emulsion, hydrogen evolution may arise even during storage. In addition, there exists a desire for further improvement in the repetitive release performance.

Compositions that include a liquid silicone having functional groups with a good adherence to bladder rubber have also been disclosed. Examples include compositions which include an aminoalkyl group-containing organopolysiloxane (JP-A S60-229719: Patent Document 18), compositions which include an organopolysiloxane containing hydrocarbon groups of 5 or more carbon atoms that have a C=C double bond (JP-A S61-100417: Patent Document 19), and siloxane compounds having a (meth)acryloyl group (JP-A 2010-241915: Patent Document 20).

PRIOR ART DOCUMENTS

Patent Documents

Patent Document 1: JP-A S57-119992
Patent Document 2: JP-A S57-111393
Patent Document 3: JP-A S63-147610
Patent Document 4: JP-A 2000-158454
Patent Document 5: JP-A S59-106948
Patent Document 6: JP-A S60-179211
Patent Document 7: JP-A H06-134769
Patent Document 8: JP-A H08-323773
Patent Document 9: JP-A H11-198150
Patent Document 10: JP-A 2005-527671
Patent Document 11: JP-A 2008-536967
Patent Document 12: JP-A 2010-505970
Patent Document 13: JP-A S61-215015
Patent Document 14: JP-A H06-339927
Patent Document 15: JP-A S62-3908
Patent Document 16: JP-A S62-275711
Patent Document 17: JP-A H11-114970
Patent Document 18: JP-A S60-229719
Patent Document 19: JP-A S61-100417
Patent Document 20: JP-A 2010-241915

SUMMARY OF THE INVENTION

Problems to be Solved by the Invention

However, these compositions that include a liquid silicone having functional groups with a good adherence to bladder rubber also lack sufficient repetitive releasability. Moreover, in the above-described publication JP-A 2000-158454 which discloses a composition containing a silicone oil and a silicone rubber powder, the silicone oil is described as an oil having organic groups such as epoxy, carboxyl, mercapto or carbinol groups. Yet, no concrete examples of use are given.

The present invention was arrived at in light of the above circumstances. The objects of the invention are to provide a release agent for tire bladders which contains an organopolysiloxane having functional groups that are not Si—H groups and that have good adhesive properties, a tire bladder coated with this release agent, and a pneumatic tire molded using this tire bladder.

Means for Solving the Problems

The inventors have conducted extensive investigations in order to achieve the above objects. As a result, we have discovered that carboxyl group-containing organopolysiloxanes react with zinc oxide and consequently adhere well to zinc oxide-containing tire bladders while yet being also a good release agent, and thus have both adherence and releasability. This discovery ultimately led to the present invention.

Accordingly, the invention provides the following release agents for tire bladders.
[1] A release agent for application to a tire bladder made of zinc oxide-containing butyl rubber when molding pneumatic tires, which release agent includes:
(A) a carboxyl group-containing organopolysiloxane of general formula (1)

[Chemical Formula 1]

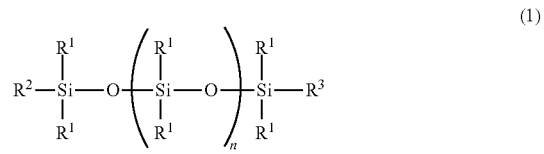

wherein $R^1$ is a substituted or unsubstituted monovalent hydrocarbon group of 1 to 30 carbon atoms other than $R^2$, $R^2$ is a carboxyl group-substituted monovalent organic group of 1 to 30 carbon atoms, $R^3$ is $R^1$ or $R^2$, and n is an integer from 3 to 2,000.
[2] A release agent for application to a tire bladder made of zinc oxide-containing butyl rubber when molding pneumatic tires, which release agent is an aqueous emulsion composition including:
(A) 100 parts by weight of the organopolysiloxane of general formula (1) in [1] above,
(B) from 1 to 30 parts by weight of a surfactant, and
(C) from 30 to 10,000 parts by weight of water.
The carboxyl group-containing organopolysiloxane of general formula (1) in component (A) preferably includes:
(A-1) a carboxyl group-containing organopolysiloxane wherein n is an integer of 3 or more and less than 150, and
(A-2) a carboxyl group-containing organopolysiloxane wherein n is an integer of 150 or more and not more than 2,000.
The blending ratio of components (A-1) and (A-2), expressed by weight, is preferably from 95:5 to 10:90.
This invention also provides a tire bladder made of zinc oxide-containing butyl rubber to which the above release agent has been applied, and a pneumatic tire molded using such a tire bladder.

Advantageous Effects of the Invention

The release agent for a tire bladder of the invention includes a carboxyl group-containing organopolysiloxane. The carboxyl group-containing organopolysiloxane adheres well to bladder rubber formulated with zinc oxide. Hence, when the bladder is stripped from the tire, the silicone remains on the bladder side, with little silicone migrating to the tire side, resulting in a high repetitive release performance. This extends the life of the tire bladder, helping to lower tire production costs.

EMBODIMENT FOR CARRYING OUT THE INVENTION

The invention is described more fully below.
In a first aspect of the invention, a release agent for a tire bladder made of zinc oxide-containing butyl rubber for use in molding pneumatic tires includes (A) an organopolysiloxane having a carboxyl group at an end of the molecular chain.

The organopolysiloxane having a carboxyl group at an end of the molecular chain serving as component (A) has general formula (1) below.

[Chemical Formula 2]

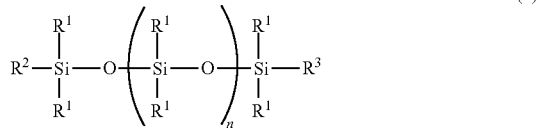

(1)

In the formula, $R^1$ is a substituted or unsubstituted monovalent hydrocarbon group of 1 to 30 carbon atoms other than $R^2$. The number of carbon atoms on $R^1$ is preferably from 1 to 20, and more preferably from 1 to 6. Illustrative examples of $R^1$ include alkyl groups such as methyl, ethyl, propyl, butyl, pentyl, hexyl, heptyl, octyl, decyl, undecyl, dodecyl, tetradecyl, pentadecyl, hexadecyl, heptadecyl, octadecyl, nonadecyl, icosyl, henicosyl, docosyl, tricosyl, tetracosyl and triacontyl groups; aryl groups such as phenyl, tolyl and naphthyl groups; aralkyl groups such as benzyl and phenethyl groups; cycloalkyl groups such as cyclopentyl, cyclohexyl and cycloheptyl groups; and monovalent hydrocarbon groups in which some or all hydrogen atoms bonded to carbon atoms on the foregoing groups are substituted with atoms such as halogen atoms (fluorine, chlorine, bromine or iodine atoms) and/or substituents such as acryloyloxy, methacryloyloxy, epoxy, amino and mercapto groups.

$R^2$ in formula (1) is a carboxyl group-substituted monovalent organic group of 1 to 30 carbon atoms. The number of carbon atoms on $R^2$ is preferably from 2 to 20, and more preferably from 2 to 15. $R^2$ is exemplified by monovalent organic groups of formulas (2) and (3) below.

[Chemical Formula 3]

(2)

(3)

$R^4$ and $R^5$ in these formulas are divalent hydrocarbon groups. Illustrative examples include alkylene groups such as methylene, ethylene, propylene, butylene, pentylene, hexylene, heptylene, octylene, decylene, undecylene, dodecylene, tetradecylene, pentadecylene, hexadecylene, heptadecylene, octadecylene, nonadecylene, icosylene, henicosylene, docosylene, tricosylene and tetracosylene groups; arylene groups such as the p-phenylene group; and also alkylene-arylene groups in which an alkylene group and an arylene group are bonded together.

$R^3$ in general formula (1) is $R^1$ or $R^2$. The organopolysiloxane of component (A) may be a mixture of an organopolysiloxane having a carboxyl group at one end of the molecular chain that is $R^1$ and an organopolysiloxane having carboxyl groups at both ends of the molecular chain that is $R^2$.

The subscript n in general formula (1) is an integer from 3 to 2,000. A composition that includes (A-1) a carboxyl group-containing organopolysiloxane in which n is an integer of 3 or more and less than 150, and (A-2) a carboxyl group-containing organopolysiloxane in which n is an integer of 150 or more and not more than 2,000 is preferred.

The organopolysiloxane of component (A-1) necessarily has a low carboxyl equivalent weight, and moreover has a low viscosity. When the amount of carboxyl groups is low, the reactivity with the zinc oxide included within the tire bladder decreases. When the amount of carboxyl groups is high, the tire bladder wettability by the organopolysiloxane decreases. The subscript n in component (A-1) is an integer of preferably from 5 to 100.

The organopolysiloxane of component (A-2) necessarily has a high carboxyl equivalent weight, and moreover has a high viscosity. This organopolysiloxane (A-2) acts to increase the tire bladder wettability by the carboxyl group-containing organopolysiloxane. The amount of adhesion to the tire bladder increases when the organopolysiloxane (A-1) having numerous carboxyl groups is used together with organopolysiloxane (A-2) relative to the use of organopolysiloxane (A-1) alone. Moreover, the slip properties with respect to the tire when the tire bladder is stripped from the tire increases. At a low viscosity, the wettability improving action and the slip properties decrease; when the viscosity is too high, the amount of carboxyl groups becomes low and so reactivity with the zinc oxide included in the tire bladder declines. The subscript n is preferably an integer from 200 to 1,500.

No limitation is imposed on the blending ratio between the organopolysiloxane of component (A-1) and the organopolysiloxane of component (A-2). However, expressed in terms of the weight ratio, the blending ratio is preferably between 95:5 and 10:90, and more preferably between 85:15 and 20:80.

An organopolysiloxane without carboxyl groups may be used together with the organopolysiloxane having a carboxyl group on the end of the molecular chain of component (A). Examples of organopolysiloxanes without a carboxyl group include dimethylpolysiloxanes and polysiloxanes obtained by substituting some of the methyl groups on a dimethylpolysiloxane with monovalent hydrocarbon groups substituted with halogen atoms (fluorine, chlorine, bromine or iodine atoms) and/or substituents such as acryloyloxy, methacryloyloxy, epoxy, amino and mercapto groups.

In the first aspect of the invention above, the organopolysiloxane having a carboxyl group at an end of the molecular chain of component (A) may be dissolved in a volatile organic solvent. The organic solvent is an ingredient included so as to increase the coatability onto the tire bladder and adjust the coating amount and viscosity. Any amount of an organic solvent that can dissolve the organopolysiloxane of component (A), such as, for example, toluene, xylene, ethyl acetate, acetone, methyl ethyl ketone, ethanol, isopropyl alcohol, hexane or heptane, may be used.

The release agent for use on a tire bladder made of zinc oxide-containing butyl rubber when molding pneumatic tires of the second aspect of the invention is a composition that is an aqueous emulsion of component (A), and contains component (A), (B) a surfactant, and (C) water.

The surfactant serving as component (B) is not limited as to the type thereof, and may be a nonionic surfactant, an anionic surfactant, a cationic surfactant or an amphoteric surfactant. Moreover, one surfactant may be used alone or two or more may be used together.

Examples of nonionic surfactants include polyoxyethylene alkyl ethers, polyoxyethylene polyoxypropylene alkyl ethers, polyoxyethylene alkyl phenyl ethers, polyethylene glycol fatty acid esters, polyoxyethylene sorbitan fatty acid esters, polyoxyethylene sorbitol fatty acid esters, polyoxyethylene glycerol fatty acid esters, polyglyceryl fatty acid esters, propylene glycol fatty acid esters, polyoxyethylene castor oil, polyoxyethylene hydrogenated castor oil, polyoxyethylene hydrogenated castor oil fatty acid esters, polyoxyethylene alkyl amines, polyoxyethylene fatty acid amides, polyoxyethylene-modified organopolysiloxanes and polyoxyethylene polyoxypropylene-modified organopolysiloxanes.

Examples of anionic surfactants include alkyl sulfates, polyoxyethylene alkyl ether sulfates, polyoxyethylene alkylphenyl ether sulfates, sulfates of fatty acid alkylolamides, alkylbenzenesulfonates, polyoxyethylene alkylphenyl ether sulfonates, α-olefin sulfonates, α-sulfo fatty acid esters, alkylnaphthalenesulfonates, alkyl diphenyl ether disulfonates, alkane sulfonates, N-acyltaurates, dialkyl sulfosuccinates, monoalkyl sulfosuccinates, polyoxyethylene alkyl ether sulfosuccinates, fatty acid salts, polyoxyethylene alkyl ether carboxylates, N-acylamino acid salts, monoalkyl phosphates, dialkyl phosphates and polyoxyethylene alkyl ether phosphates.

Examples of cationic surfactants include alkyltrimethylammonium salts, dialkyldimethylammonium salts, polyoxyethylene alkyldimethylammonium salts, dipolyoxyethylene alkylmethylammonium salts, tripolyoxyethylene alkylammonium salts, alkylbenzyldimethylammonium salts, alkylpyridinium salts, monoalkylamine salts and monoalkylamide amine salts.

Examples of amphoteric surfactants include alkyl dimethyl amine oxides, alkyl dimethyl carboxybetaines, alkylamide propyl dimethyl carboxybetaines, alkyl hydroxysulfobetaines and alkyl carboxymethyl hydroxyethyl imidazolinium betaines.

When a nonionic surfactant is used as the surfactant of component (B), the hydrophilic-lipophilic balance (HLB) value thereof is preferably from 11 to 17. At an HLB value lower than 11 or higher than 17, emulsification of component (A) may not be possible, or it becomes difficult to obtain an emulsion having good stability. The HLB value in this invention is the value calculated by the Griffin formula expressed as follows.

$$HLB = [\text{molecular weight of polyoxyethylene moiety} / \text{molecular weight of polyoxyethylene alkyl ether}] \times 20$$

When a combination of two or more nonionic surfactants of differing HLB values is used, the above HLB value becomes the weight-averaged value of these.

The amount of component (B) is from 1 to 30 parts by weight, and preferably from 5 to 15 parts by weight, per 100 parts by weight of component (A). At less than 1 part by weight, it is difficult to obtain an emulsion of good stability; at more than 30 parts by weight, further improvement in the emulsion stability is unlikely.

The amount of water serving as component (C) is from 30 to 10,000 parts by weight per 100 parts by weight of component (A). At less than 30 parts by weight, the viscosity of the emulsion becomes high, making application to a tire bladder difficult. At more than 10,000 parts by weight, the coating amount of component (A) on the tire bladder becomes low, resulting in a decline in the release properties. The amount of component (C) should be such as to set the coating amount of component (A) on the tire bladder to the desired amount.

Emulsification of component (A) may be carried out using an ordinary emulsifying disperser. Examples of such emulsifying dispersers include high-speed rotary centrifugal radiation-type stirrers such as homogenizing dispersers, high-speed rotary shear-type stirrers such as homogenizing mixers, high-pressure jet-type emulsifying dispersers such as homogenizers, colloid mills and ultrasonic emulsifiers.

A water-soluble polymer may be included in the aqueous emulsion of the invention for such purposes as to adjust the coating amount on the tire bladder, prevent dripping during application and improve wettability. The water-soluble polymer, which is not particularly limited, is exemplified by nonionic water-soluble polymers, anionic water-soluble polymers, cationic water-soluble polymers and amphoteric water-soluble polymers. Examples of nonionic water-soluble polymers include copolymers of vinyl alcohol and vinyl acetate, polymers of acrylamide, polymers of vinylpyrrolidone, copolymers of vinylpyrrolidone and vinyl acetate, polyethylene glycol, polymers of isopropyl acrylamide, polymers of methyl vinyl ether, starch, methyl cellulose, hydroxyethyl cellulose, hydroxypropyl cellulose, guar gum and xanthan gum. Examples of anionic water-soluble polymers include polymers of sodium acrylate, copolymers of sodium acrylate and sodium maleate, copolymers of sodium acrylate and acrylamide, polymers of sodium styrene sulfonate, copolymers of sodium polyisoprene sulfonate and styrene, polymers of sodium naphthalene sulfonate, carboxymethyl starch, starch phosphate, carboxymethylcellulose, sodium alginate, gum arabic, carrageenan, sodium chondroitin sulfate and sodium hyaluronate. Examples of cationic water-soluble polymers include polymers of dimethyldiallylammonium chloride, polymers of vinylimidazoline, polymers of methylvinylimidazolinium chloride, polymers of acryloylethyltrimethylammonium chloride, polymers of methacryloylethyltrimethylammonium chloride, polymers of acrylamide propyl trimethylammonium chloride, polymers of methacrylamide propyl trimethylammonium chloride, epichlorohydrin/dimethylamine polymers, polymers of ethyleneimine, quaternized polymers of ethyleneimine, polymers of allylamine hydrochloride, polylysine, cationic starch, cationized cellulose, chitosan and derivatives of these obtained by, for example, copolymerizing these with a monomer having a nonionic group or an anionic group. Examples of amphoteric water-soluble polymers include copolymers of acryloylethyltrimethylammonium chloride with acrylic acid and acrylamide, copolymers of methacryloylethyltrimethylammonium chloride with acrylic acid and acrylamide, and products of the Hoffman degradation of acrylamide polymers.

When these water-soluble polymers are included, the content thereof is preferably from 0.1 to 10 parts by weight per 100 parts by weight of component (C).

In addition, wetting agents, defoamers and preservatives may be included in the aqueous emulsion of the invention.

In order to increase the slip properties with the tire when the tire bladder is stripped from the molded tire, the release agent of the invention may also include an inorganic powder such as calcium carbonate, magnesium carbonate, kaolin, clay, talc, mica, sericite or carbon black.

In the practice of this invention, the release agent of the first aspect or the release agent of the second aspect is applied to a tire bladder.

The tire bladder used in the invention is made of a composition which is composed primarily of butyl rubber and preferably includes halogenated butyl rubber and/or chloroprene. The butyl rubber composition must contain zinc oxide. Zinc oxide reacts with the carboxyl groups on the organopolysiloxane having carboxyl groups at the ends of the molecular chain that serves as component (A), resulting in better adhesion of the organopolysiloxane to the tire bladder surface and improved repetitive releasability.

In addition to the above rubber ingredients, fillers such as carbon black, resins, castor oil, and vulcanization accelerators may be suitably included according to the intended purpose. Zinc oxide is included in an amount of preferably 0.1 to 10 parts by weight, and more preferably 3 to 5 parts by weight, per 100 parts by weight of the rubber ingredients.

The release agent of the first aspect of the invention or the release agent of the second aspect of the invention is applied to the tire bladder surface by a method such as spraying, dipping or brush coating, following which it is heated for a period of from several tens of minutes to several hours at a temperature of between 80° C. and 250° C. When the heating temperature is low, the reactivity of the organopolysiloxane of component (A) with zinc oxide decreases. When the temperature is high, the tire bladder deteriorates. The heating temperature is preferably between 100° C. and 200° C.

The coating amount of the release agent is not particularly limited, although application is preferably carried out such that the amount of the organopolysiloxane of component (A) becomes 0.5 to 20 g/m$^2$, and especially 1.0 to 10 g/m$^2$.

This invention uses a tire bladder that has been coated in this way with a release agent to mold pneumatic tires. A green tire is placed in a mold, the tire bladder coated with release agent is inserted on the inside of the tire, the green tire is pressed against the mold by introducing into the interior of the tire bladder a high-temperature, high-pressure gas, such as 150 to 200° C. steam having a pressure of about 1 to 3 MPa, and molding and curing of the tire, which takes from several minutes to several hours, is carried out. The bladder and the molded and cured tire are then taken out of the mold. A green tire is again placed in the mold, the tire bladder is inserted on the inside of the tire, and the same operations are repeated.

EXAMPLES

The invention is illustrated more fully below by way of Working Examples and Comparative Examples, although these Examples are not intended to limit the invention. In the following Examples, unless noted otherwise, all references to percent (%) are by weight.

[Evaluation of Adherence to Zinc Oxide-Containing Butyl Rubber]

Gauze impregnated with organopolysiloxane or organopolysiloxane emulsion was used to apply organopolysiloxane or organopolysiloxane emulsion to a 2 mm thick sheet of butyl rubber formulated with zinc oxide, following which the rubber sheet was placed in a thermostatic chamber set to 150° C. and heated for 50 minutes. The rubber sheet was then immersed for 10 minutes in 1-butanol, in addition to which the side of the sheet to which organopolysiloxane or organopolysiloxane emulsion had been applied was wiped with a 1-butanol-impregnated gauze. After 24 hours of air drying, the amount of organopolysiloxane remaining on the butyl rubber sheet was measured using a fluorescence x-ray spectrometer.

[Test of Tire Bladder Releasability]

A test piece obtained by applying organopolysiloxane or organopolysiloxane emulsion to slab rubber (cured) from a cured bladder and then rinsing the rubber with butanol was laminated to a tire inner liner (uncured) and repeatedly press-cured at 190° C. for 15 minutes. The force when pulling these apart after carrying out the above operation ten or more times was determined.

Good    Fair    No Good (NG)

← Good releasability    Poor releasability →

Working Example 1

The organopolysiloxane of average formula (4) below having carboxyl groups at both ends of the molecular chain, a viscosity of 126 mm$^2$/s and a carboxyl equivalent weight of 880 g/mol was furnished for use.

An organopolysiloxane mixture which had a viscosity of 34,000 mm$^2$/s and a carboxyl equivalent weight of 59,600 g/mol and was composed of the organopolysiloxane of average formula (5) below having a carboxyl group at one end of the molecular chain, the organopolysiloxane of average formula (6) below having carboxyl groups at both ends of the molecular chain and the dimethylpolysiloxane of average formula (7) below in the weight ratio 5:2.5:2.5 was furnished for use.

The organopolysiloxane of average formula (4) in an amount of 300 g was mixed together with 200 g of the mixture of the organopolysiloxanes of average formulas (5), (6) and average formula (7). Using the resulting mixture, the evaluation of adherence to butyl rubber and the releasability test described above were carried out. The results are presented in Table 1.

[Chemical Formula 4]

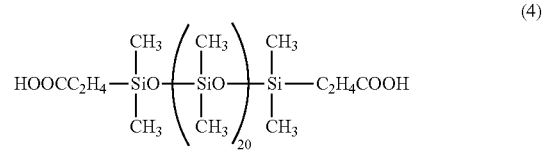

(4)

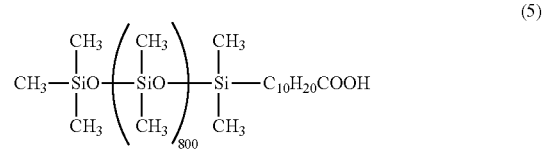

(5)

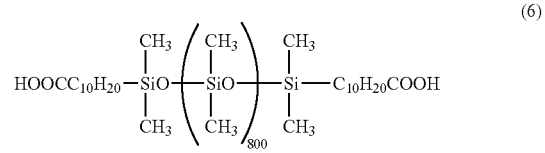

(6)

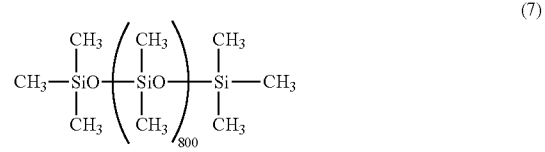

(7)

Working Example 2

An amount of 250 g of the organopolysiloxane of average formula (4) having carboxyl groups at both ends of the molecular chain, a viscosity of 126 mm$^2$/s and a carboxyl equivalent weight of 880 g/mol was mixed with 250 g of the organopolysiloxane of average formula (6) below having carboxyl groups at both ends of the molecular chain, a viscosity of 66,700 mm$^2$/s and a carboxyl equivalent weight of 27,200 g/mol. Using the resulting mixture, the evaluation of adherence to butyl rubber and the releasability test described above were carried out. The results are presented in Table 1.

Working Example 3

An organopolysiloxane mixture which had a viscosity of 60 mm²/s and a carboxyl equivalent weight of 1,440 g/mol and was composed of the organopolysiloxane of average formula (8) below having a carboxyl group at one end of the molecular chain, the organopolysiloxane of average formula (9) below having carboxyl groups at both ends of the molecular chain and the dimethylpolysiloxane of average formula (10) below in the weight ratio 5:2.5:2.5 was furnished for use.

The organopolysiloxane of average formula (6) above having carboxyl groups at both ends of the molecular chain, a viscosity of 66,700 mm²/s and a carboxyl equivalent weight of 27,200 g/mol was furnished for use.

The mixture of organopolysiloxanes of average formulas (8), (9) and (10) in an amount of 350 g and 150 g of the organopolysiloxane of average formula (6) were mixed together and dissolved. Using the resulting mixture, the evaluation of adherence to butyl rubber and the releasability test described above were carried out. The results are presented in Table 1.

[Chemical Formula 5]

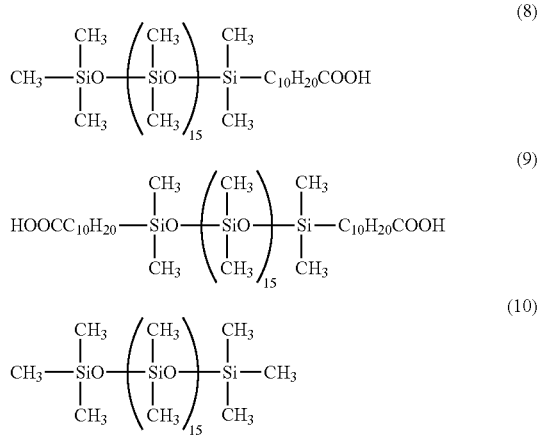

Working Example 4

A 300 mL glass beaker was charged with 60 g of the organopolysiloxane of average formula (4) having carboxyl groups at both ends of the molecular chain, a viscosity of 126 mm²/s and a carboxyl equivalent weight of 880 g/mol. To this was added 40 g of an organopolysiloxane mixture which had a viscosity of 34,000 mm²/s and a carboxyl equivalent weight of 59,600 g/mol and was composed of the organopolysiloxane of average formula (5) having a carboxyl group at one end of the molecular chain, the organopolysiloxane of average formula (6) having carboxyl groups at both ends of the molecular chain and the dimethylpolysiloxane of average formula (7) in the weight ratio 5:2.5:2.5. Using a homogenizing mixer, the beaker contents were mixed together at a speed of 2,000 rpm. Next, 9 g of a polyoxyethylene alkyl ether for which the number of moles of ethylene oxide added=8 moles (available from Kao Corporation under the trade name Emulgen 1108), 2 g of a 60% aqueous solution of a polyoxyethylene alkyl ether for which the number of moles of ethylene oxide added=50 moles (available from Kao Corporation under the trade name Emulgen 1150S-60) and 27 g of water were added. Using a homogenizing mixer, the beaker contents were stirred at a speed of 7,000 rpm, whereupon an oil-in-water system formed and an increase in viscosity was confirmed. Stirring was continued for another 15 minutes. Next, under stirring at 2,000 rpm, 112 g of water was added, after which the beaker contents were transferred to a 1-liter glass beaker, 750 g of a 2% aqueous solution of carboxymethylcellulose sodium (available from DKS Co., Ltd. under the trade name Cellogen F) was added and the system was stirred at 2,000 rpm, giving a white emulsion.

Using the emulsion thus prepared, the evaluation of adherence to butyl rubber and the releasability test described above were carried out. The results are presented in Table 1.

Working Example 5

A 300 mL glass beaker was charged with 50 g of the organopolysiloxane of average formula (4) having carboxyl groups at both ends of the molecular chain, a viscosity of 126 mm²/s and a carboxyl equivalent weight of 880 g/mol, and 50 g of the organopolysiloxane of average formula (6) having carboxyl groups at both ends of the molecular chain, a viscosity of 66,700 mm²/s and a carboxyl equivalent weight of 27,200 g/mol. Using a homogenizing mixer, the beaker contents were mixed together at a speed of 2,000 rpm. Next, 9 g of a polyoxyethylene alkyl ether for which the number of moles of ethylene oxide added=8 mol (available from Kao Corporation under the trade name Emulgen 1108), 2 g of a 60% aqueous solution of a polyoxyethylene alkyl ether for which the number of molecules of ethylene oxide added=50 moles (available from Kao Corporation under the trade name Emulgen 1150S-60) and 27 g of water were added. Using a homogenizing mixer, the beaker contents were stirred at a speed of 7,000 rpm, whereupon an oil-in-water system formed and an increase in viscosity was confirmed. Stirring was continued for another 15 minutes. Next, under stirring at 2,000 rpm, 112 g of water was added, after which the beaker contents were transferred to a 1-liter glass beaker, 750 g of a 2% aqueous solution of carboxymethylcellulose sodium (available from DKS Co., Ltd. under the trade name Cellogen F) was added and the system was stirred at 2,000 rpm, giving a white emulsion.

Using the emulsion thus prepared, the evaluation of adherence to butyl rubber and the releasability test described above were carried out. The results are presented in Table 1.

Working Example 6

A 300 mL glass beaker was charged with 60 g of the organopolysiloxane of average formula (4) having carboxyl groups at both ends of the molecular chain, a viscosity of 126 mm²/s and a carboxyl equivalent weight of 880 g/mol. To this was added 40 g of an organopolysiloxane mixture which had a viscosity of 34,000 mm²/s and a carboxyl equivalent weight of 59,600 g/mol and was composed of the organopolysiloxane of average formula (5) having a carboxyl group at one end of the molecular chain, the organopolysiloxane of average formula (6) having carboxyl groups at both ends of the molecular chain and the dimethylpolysiloxane of average formula (7) in the weight ratio 5:2.5:2.5. Using a homogenizing mixer, the beaker contents were mixed together at a speed of 2,000 rpm. Next, 9 g of a polyoxyethylene alkyl ether for which the number of moles of ethylene oxide added=8 moles (available from Kao Corporation under the trade name Emulgen 1108), 2 g of a 60% aqueous solution of a polyoxyethylene alkyl ether for which the number of moles of ethylene oxide added=50 moles (available from Kao Corporation under the trade name Emulgen 1150S-60) and 27 g of water were added. Using a homogenizing mixer, the beaker contents were stirred at a speed of 7,000 rpm, whereupon an oil-in-water system formed and an increase in viscosity was confirmed. Stirring was continued for another 15 minutes. Next, while stirring at 2,000 rpm, 112 g of water was added. The beaker contents were transferred to a 1-liter glass beaker, 5 g of an emulsion containing 42% of the dimethylpolysiloxane of average formula (13) below having a viscosity of 1,950,000 mm²/s and 745 g of a 2% aqueous solution of carboxymethylcellulose sodium (available from DKS Co., Ltd. under the trade name Cellogen F) were added, and the system was stirred at 2,000 rpm, giving a white emulsion.

Using the emulsion thus prepared, the evaluation of adherence to butyl rubber and the releasability test described above were carried out. The results are presented in Table 1.

[Chemical Formula 6]

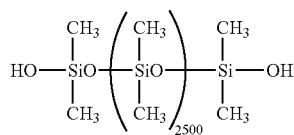

(13)

Working Example 7

A 300 mL glass beaker was charged with 67.5 g of the organopolysiloxane of average formula (4) having carboxyl groups at both ends of the molecular chain, a viscosity of 126 mm²/s and a carboxyl equivalent weight of 880 g/mol. To this was added 22.5 g of an organopolysiloxane mixture which had a viscosity of 60 mm²/s and a carboxyl equivalent weight of 1,440 g/mol and was composed of the organopolysiloxane of average formula (8) having a carboxyl group at one end of the molecular chain, the organopolysiloxane of average formula (9) having carboxyl groups at both ends of the molecular chain and the dimethylpolysiloxane of average formula (10) in the weight ratio 5:2.5:2.5. To this was further added 10 g of the organopolysiloxane of average formula (14) having amino groups on side chains of the molecule, a viscosity of 55,100 mm²/s and an amino equivalent weight of 10,500 g/mol. Using a homogenizing mixer, the beaker contents were mixed together at a speed of 2,000 rpm. Next, 9 g of a polyoxyethylene alkyl ether for which the number of moles of ethylene oxide added=8 moles (available from Kao Corporation under the trade name Emulgen 1108), 2 g of a 60% aqueous solution of a polyoxyethylene alkyl ether having a number of moles of ethylene oxide added=50 moles (available from Kao Corporation under the trade name Emulgen 1150S-60) and 27 g of water were added. Using a homogenizing mixer, the beaker contents were stirred at a speed of 7,000 rpm, whereupon an oil-in-water system formed and an increase in viscosity was confirmed. Stirring was continued for another 15 minutes. Next, under stirring at 2,000 rpm, 112 g of water was added. The beaker contents were transferred to a 1-liter glass beaker, 320 g of a 2% aqueous solution of hydroxypropyl methylcellulose (available from Shin-Etsu Chemical Co., Ltd. under the trade name Metolose 90SH-100000) and 430 g of water were added, and the system was stirred at 2,000 rpm, giving a white emulsion.

Using the emulsion thus prepared, the evaluation of adherence to butyl rubber and the releasability test described above were carried out. The results are presented in Table 1.

[Chemical Formula 7]

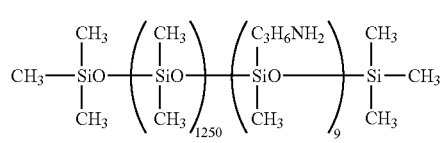

(14)

Working Example 8

Mica (available from Shiraishi Calcium Kaisha, Ltd. under the trade name Takaramica M-101) in an amount of 5 g was added to 1,000 g of an emulsion obtained in the same way as in Working Example 4. Using a homogenizing mixer, the system was mixed for 5 minutes at a speed of 2,000 rpm.

Using the emulsion thus prepared, the evaluation of adherence to butyl rubber and the releasability test described above were carried out. The results are presented in Table 1.

Comparative Example 1

An amount of 300 g of the dimethylpolysiloxane of average formula (11) having a viscosity of 101 mm²/s and 200 g of the dimethylpolysiloxane of average formula (12) having a viscosity of 30,200 mm²/s were mixed together and dissolved. Using this mixture, the evaluation of adherence to butyl rubber and the releasability test described above were carried out. The results are presented in Table 1.

[Chemical Formula 8]

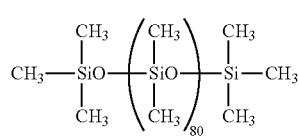

(11)

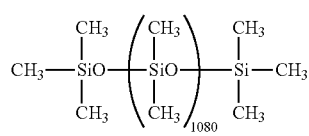

(12)

Comparative Example 2

A 300 mL glass beaker was charged with 60 g of the dimethylpolysiloxane of average formula (11) having a viscosity of 101 mm²/s and 40 g of the dimethylpolysiloxane of average formula (12) having a viscosity of 30,200 mm²/s. Using a homogenizing mixer, the beaker contents were mixed together at a speed of 2,000 rpm. Next, 9 g of a polyoxyethylene alkyl ether for which the number of moles of ethylene oxide added=8 moles (available from Kao Corporation under the trade name Emulgen 1108), 2 g of a 60% aqueous solution of a polyoxyethylene alkyl ether for which the number of moles of ethylene oxide added=50 moles (available from Kao Corporation under the trade name Emulgen 1150S-60) and 10 g of water were added. Using a homogenizing mixer, the beaker contents were stirred at a speed of 7,000 rpm, whereupon an oil-in-water system formed and an increase in viscosity was confirmed. The homogenizing mixer was changed to a homogenizing disperser and the system was stirred at a speed of 2,000 rpm for 15 minutes. Next, the stirrer was returned once again to a homogenizing mixer, 119 g of water was added and the system was stirred at 2,000 rpm. The contents were then transferred to a 1-liter glass bearer, 750 g of a 2% aqueous solution of carboxymethylcellulose sodium (available from DKS Co., Ltd. under the trade name Cellogen F) was added, and the system was stirred at 2,000 rpm, giving a white emulsion.

Using the emulsion thus prepared, the evaluation of adherence to butyl rubber and the releasability test described above were carried out. The results are presented in Table 1.

TABLE 1

|  | Evaluation of adherence to bladder rubber (amount of organopolysiloxane, g/m$^2$) | Tire bladder releasability test |
|---|---|---|
| Working Example 1 | 2.28 | good |
| Working Example 2 | 2.93 | fair |
| Working Example 3 | 1.90 | good |
| Working Example 4 | 1.67 | good |
| Working Example 5 | 2.25 | fair |
| Working Example 6 | 1.65 | good |
| Working Example 7 | 1.14 | good |
| Working Example 8 | 1.10 | good |
| Comparative Example 1 | 0.009 | NG |
| Comparative Example 2 | 0.004 | NG |

Compared with the carboxyl group-lacking methylpolysiloxanes and emulsions thereof in Comparative Examples 1 and 2, the carboxyl group-containing organopolysiloxanes or organopolysiloxane mixtures containing the same, and emulsions thereof, in Working Examples 1 to 8, when applied to a butyl rubber sheet which was subsequently rinsed with butanol, resulted in a higher amount of polysiloxane remaining thereon and also better releasability Working Example 9

Toluene (700 g) was added to 300 g of the organopolysiloxane prepared in Working Example 1, and mixing and dissolution carried out. The resulting solution was applied with a spray to the surface of a tire bladder made of zinc oxide-containing butyl rubber, and subsequently heated at 150° C. for 50 minutes. Tire curing/molding was carried out using the resulting bladder, and the bladder life was evaluated. The results are shown in Table 2.

Working Example 10

The emulsion prepared in Working Example 4 was applied with a spray to the surface of a tire bladder made of zinc oxide-containing butyl rubber, and subsequently heated at 150° C. for 50 minutes. Tire curing/molding was carried out using the resulting bladder, and the bladder life was evaluated. The results are shown in Table 2.

Working Example 11

The emulsion prepared in Working Example 5 was applied with a spray to the surface of a tire bladder made of zinc oxide-containing butyl rubber, and subsequently heated at 150° C. for 50 minutes. Tire curing/molding was carried out using the resulting bladder, and the bladder life was evaluated. The results are shown in Table 2.

Working Example 12

The emulsion prepared in Working Example 6 was applied with a spray to the surface of a tire bladder made of zinc oxide-containing butyl rubber, and subsequently heated at 150° C. for 50 minutes. Tire curing/molding was carried out using the resulting bladder, and the bladder life was evaluated. The results are shown in Table 2.

Working Example 13

The emulsion prepared in Working Example 7 was applied with a spray to the surface of a tire bladder made of zinc oxide-containing butyl rubber, and subsequently heated at 150° C. for 50 minutes. Tire curing/molding was carried out using the resulting bladder, and the bladder life was evaluated. The results are shown in Table 2.

Working Example 14

The emulsion prepared in Working Example 8 was applied with a spray to the surface of a tire bladder made of zinc oxide-containing butyl rubber, and subsequently heated at 150° C. for 50 minutes. Tire curing/molding was carried out using the resulting bladder, and the bladder life was evaluated. The results are shown in Table 2.

Comparative Example 3

The emulsion prepared in Comparative Example 2 was applied with a spray to the surface of a tire bladder made of zinc oxide-containing butyl rubber, and subsequently heated at 150° C. for 50 minutes. Tire curing/molding was carried out using the resulting bladder, and the bladder life was evaluated. The results are shown in Table 2.

TABLE 2

|  | Working Example 9 | Working Example 10 | Working Example 11 | Working Example 12 | Working Example 13 | Working Example 14 | Comparative Example 3 |
|---|---|---|---|---|---|---|---|
| Bladder life | 130 | 120 | 110 | 150 | 110 | 110 | 100 |

Note: Values indicated are relative to an arbitrary value of 100 for the bladder life in Comparative Example 3.

oxide-containing butyl rubber, and subsequently heated at 150° C. for 50 minutes. Tire curing/molding was carried out using the resulting bladder, and the bladder life was evaluated. The results are shown in Table 2.

Compared with the emulsion of the carboxyl group-lacking methylpolysiloxane in Comparative Example 3, the organopolysiloxane mixtures including the carboxyl group-containing organopolysiloxanes, and the emulsions of the carboxyl group-containing organopolysiloxanes, or the emulsions of the organopolysiloxane mixtures including the carboxyl group-containing organopolysiloxanes, in Working Examples 9 to 14, resulted in a longer bladder life.

The invention claimed is:

1. A release agent for application to a tire bladder made of zinc oxide-containing butyl rubber when molding pneumatic tires, which release agent is an aqueous emulsion composition comprising:
(A) 100 parts by weight of a carboxyl group-containing organopolysiloxane of general formula (1)

[Chemical Formula 1]

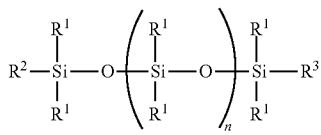

(1)

wherein $R^1$ is a substituted or unsubstituted monovalent hydrocarbon group of 1 to 30 carbon atoms other than $R^2$, $R^2$ is a carboxyl group-substituted monovalent organic group of 1 to 30 carbon atoms, $R^3$ is $R^1$ or $R^2$, and n is an integer from 3 to 2,000,
(B) from 1 to 30 parts by weight of a surfactant, and
(C) from 30 to 10,000 parts by weight of water.

2. A method of producing a tire bladder for molding pneumatic tires, comprising the step of applying the release agent of the composition of claim 1 to a tire bladder surface made of zinc oxide-containing butyl rubber and subsequently heating at a temperature of between 80 and 250° C.

3. The release agent for a tire bladder of claim 1, which further comprises a water-soluble polymer in an amount of 0.1 to 10 parts by weight per 100 parts by weight of component (C).

4. The release agent for a tire bladder of claim 1, which further comprises an inorganic powder selected from among calcium carbonate, magnesium carbonate, kaolin, clay, talc, mica, sericite and carbon black.

5. The release agent for a tire bladder of claim 1, wherein $R^2$ in formula (1) is the carboxyl group-substituted monovalent organic group of the following formula (2) or (3):

[Chemical Formula 3]

(2)

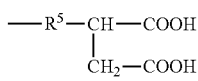
(3)

wherein $R^4$ and $R^5$ each are a divalent hydrocarbon group.

6. The release agent for a tire bladder of claim 1, wherein component (A) is a mixture of an organopolysiloxane having a carboxyl group at one end of the molecular chain and an organopolysiloxane having carboxyl groups at both ends of the molecular chain.

7. The release agent for a tire bladder of claim 1, which further comprises an organopolysiloxane without carboxyl groups together with component (A).

8. The release agent for a tire bladder of claim 7, wherein the organopolysiloxane without carboxyl groups is selected from among a dimethylpolysiloxane and a polysiloxane obtained by substituting some of the methyl groups on the dimethylpolysiloxane with monovalent hydrocarbon groups substituted with halogen atoms and/or substituents selected from among acryloyloxy, methacryloyloxy, epoxy, amino and mercapto groups.

9. A method of claim 2, wherein the application is carried out such that the amount of the organopolysiloxane of component (A) becomes 0.5 to 20 g/m².

10. A method of molding a pneumatic tire, comprising the step of placing a green tire in a mold, inserting the tire bladder obtained by a method of claim 2 or 9 in the inside of the green tire, introducing into the interior of the tire bladder a high-temperature, high-pressure gas so that the green tire is pressed against the mold, molding, and curing the tire.

11. The release agent for a tire bladder of claim 1, wherein the carboxyl group-containing organopolysiloxane of general formula (1) in component (A) includes: (A-1) a carboxyl group-containing organopolysiloxane wherein n is an integer of 3 or more and less than 150, and (A-2) a carboxyl group-containing organopolysiloxane wherein n is an integer of 150 or more and not more than 2,000.

12. The release agent for a tire bladder of claim 11, wherein the blending ratio of components (A-1) and (A-2), expressed by weight, is from 95:5 to 10:90.

* * * * *